(12) United States Patent
Thomas et al.

(10) Patent No.: US 11,169,884 B2
(45) Date of Patent: *Nov. 9, 2021

(54) RECOVERY SUPPORT TECHNIQUES FOR STORAGE VIRTUALIZATION ENVIRONMENTS

(71) Applicant: NetApp Inc., Sunnyvale, CA (US)

(72) Inventors: Deepak Thomas, Apex, NC (US); Dan Sarisky, Cary, NC (US); Nagender Somavarapu, Sunnyvale, CA (US); Santosh Lolayekar, Saratoga, CA (US)

(73) Assignee: NetApp Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/866,984

(22) Filed: May 5, 2020

(65) Prior Publication Data

US 2020/0264956 A1  Aug. 20, 2020

Related U.S. Application Data

(63) Continuation of application No. 15/011,656, filed on Jan. 31, 2016, now Pat. No. 10,719,403.

(51) Int. Cl.
*G06F 11/14* (2006.01)
*G06F 3/06* (2006.01)

(52) U.S. Cl.
CPC ........ *G06F 11/1446* (2013.01); *G06F 3/0664* (2013.01); *G06F 3/0665* (2013.01); *G06F 11/1435* (2013.01); *G06F 2201/815* (2013.01)

(58) Field of Classification Search
CPC .. G06F 11/1446; G06F 3/0664; G06F 3/0665; G06F 11/1435; G06F 2201/815
See application file for complete search history.

(56) References Cited

U.S. PATENT DOCUMENTS

| | | | |
|---|---|---|---|
| 7,657,530 B2 | 2/2010 | Borthakur et al. | |
| 8,407,437 B1 | 3/2013 | Cheng et al. | |
| 8,949,180 B1* | 2/2015 | Natanzon | G06F 16/27 707/610 |
| 2005/0246401 A1 | 11/2005 | Edwards et al. | |
| 2009/0077097 A1 | 3/2009 | Lacapra et al. | |
| 2009/0271618 A1 | 10/2009 | Camenisch et al. | |
| 2010/0114990 A1 | 5/2010 | Mehra et al. | |
| 2010/0281207 A1 | 11/2010 | Miller et al. | |
| 2011/0035548 A1 | 2/2011 | Kimmel et al. | |
| 2011/0191522 A1 | 8/2011 | Condict et al. | |
| 2011/0213754 A1 | 9/2011 | Bindal et al. | |
| 2011/0246731 A1 | 10/2011 | Ninose et al. | |
| 2013/0054890 A1 | 2/2013 | Desai et al. | |
| 2013/0054932 A1 | 2/2013 | Acharya et al. | |
| 2013/0055249 A1* | 2/2013 | Vaghani | G06F 9/45558 718/1 |

(Continued)

*Primary Examiner* — Andrew J Cheong
(74) *Attorney, Agent, or Firm* — Cooper Legal Group, LLC

(57) ABSTRACT

Recovery support techniques for storage virtualization environments are described. In one embodiment, for example, a method may be performed that comprises defining, by processing circuitry, a storage container comprising one or more logical storage volumes of a logical storage array of a storage system, associating the storage container with a virtual volume (vvol) datastore, identifying metadata for a vvol of the vvol datastore, and writing the metadata for the vvol to the storage system. Other embodiments are described and claimed.

18 Claims, 8 Drawing Sheets

(56) References Cited

U.S. PATENT DOCUMENTS

| | | |
|---|---|---|
| 2015/0058663 A1 | 2/2015 | Schmidt et al. |
| 2015/0347548 A1 | 12/2015 | Mortensen et al. |
| 2016/0055169 A1* | 2/2016 | Sibbald ............... G06F 16/1748 707/664 |
| 2016/0259586 A1 | 9/2016 | Tylik et al. |

* cited by examiner

RECOVERY SUPPORT TECHNIQUES FOR STORAGE VIRTUALIZATION ENVIRONMENTS

This application claims priority to and is a continuation of U.S. application Ser. No. 15/011,656, filed on Jan. 31, 2016, now allowed, titled "RECOVERY SUPPORT TECHNIQUES FOR STORAGE VIRTUALIZATION ENVIRONMENTS," which is incorporated herein by reference.

BACKGROUND

In order to enable the provision and/or management of storage capacity at a per-virtual machine (VM) level of granularity, a virtual volume (vvol) storage environment may be presented to a virtualization system. In such a vvol storage environment, a set of storage resources of a storage system may be presented to the virtualization system as a vvol datastore, via one or more layers of abstraction. The virtualization system may create vvols within the vvol datastore and make those vvols available for use by VMs running within the virtualization system. Support for the abstraction associated with implementation of the vvol storage environment may be provided by an intermediary framework, within which various types of metadata may be retained during the course of ongoing operation.

DETAILED DESCRIPTION

Various embodiments are generally directed to recovery support techniques for storage virtualization environments. In one embodiment, for example, a method may be performed that comprises defining, by processing circuitry, a storage container comprising one or more logical storage volumes of a logical storage array of a storage system, associating the storage container with a virtual volume (vvol) datastore, identifying metadata for a vvol of the vvol datastore, and writing the metadata for the vvol to the storage system. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
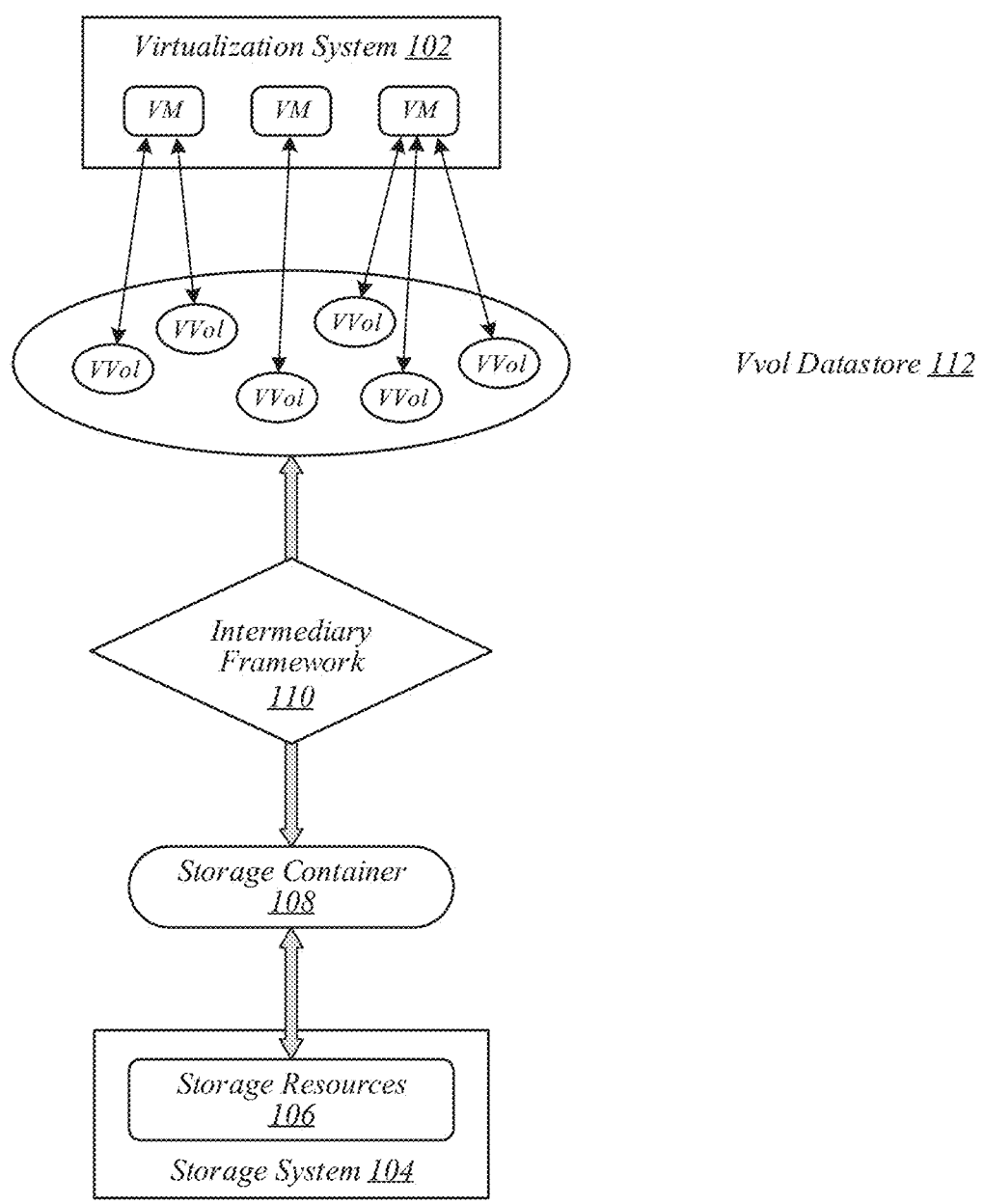
FIG. 1 illustrates an embodiment of a first operating environment.

FIG. 1 illustrates an example of an operating environment 100 that may be representative of various embodiments. In operating environment 100, a plurality of virtual machines (VMs) may run within a virtualization system 102. Virtualization system 102 may generally comprise a combination of hardware and/or software capable of implementing/executing virtual machines. In some embodiments, virtualization system 102 may comprise a cluster of virtualization servers, such as an EXSi server cluster. In operating environment 100, there may be storage requirements associated with the ongoing execution/operation of the VMs running in virtualization system 102. In various embodiments, storage resources 106 of a storage system 104 may be used to accommodate such storage requirements. In some embodiments, storage system 104 may generally comprise a combination of hardware and/or software capable of storing data. In various embodiments, storage system 104 may comprise a clustered storage system. In some embodiments, storage system 104 may comprise a storage area network (SAN) storage system. In various other embodiments, storage system 104 may comprise a network-attached storage (NAS) storage system. The embodiments are not limited to these examples.

In some embodiments, in order to enable the provision and/or management of storage capacity at a per-VM level of granularity, it may be desirable that storage resources 106 be made available to virtualization system 102 via one or more layers of abstraction. In various embodiments, such abstraction may generally be implemented using an intermediary framework 110. In some embodiments, intermediary framework 110 may be operative to define a storage container 108, allocate storage resources 106 to that storage container 108, and establish/implement an association between storage container 108 and a virtual volume (vvol) datastore 112 that it presents to virtualization system 102. In various embodiments, virtualization system 102 may be configured to accommodate the storage requirements of its virtual machines by defining vvols within vvol datastore 112 and presenting such vvols to its virtual machines. As reflected in FIG. 1, in some embodiments, multiple vvols may be allocated to a given VM. In some embodiments, the ability to create and allocate vvols may enable virtualization system 102 to manage the provision of storage capacity to its virtual machines at a per-VM level of granularity. The embodiments are not limited in this context.

Figure 2:
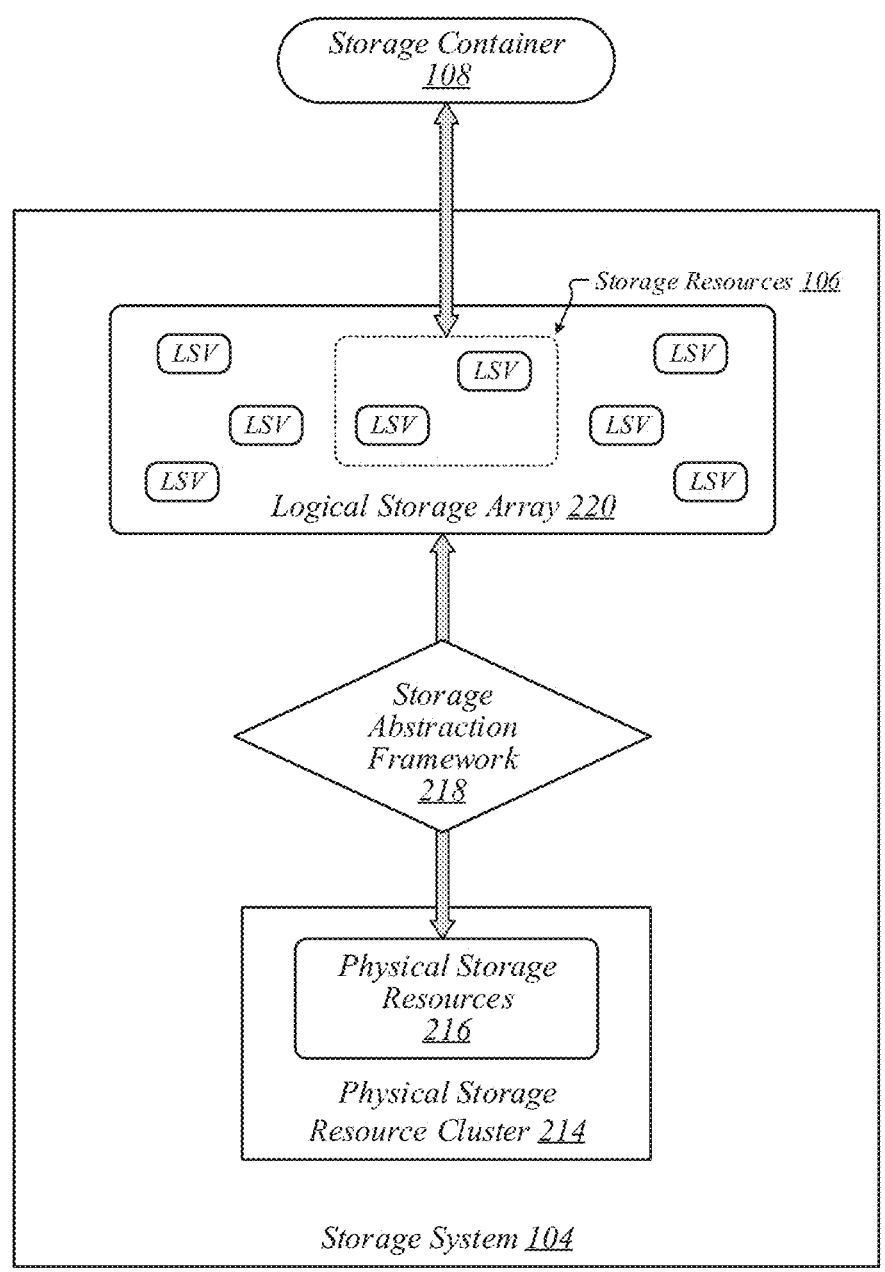
FIG. 2 illustrates an embodiment of a second operating environment.

FIG. 2 illustrates an example of an operating environment 200 that may be representative of various embodiments. In operating environment 200, storage system 104 includes a physical storage resource cluster 214. In some embodiments, physical storage resource cluster 214 may comprise physical storage resources of each of a plurality of storage servers in a storage server cluster. In various embodiments, storage system 104 may also include a storage abstraction framework 218. Storage abstraction framework 218 may generally comprise a combination of hardware and/or software capable of implementing one or more layers of abstraction with respect to the physical storage resources of physical storage resource cluster 214. In some embodiments, storage abstraction framework 218 may be operative to associate a given set of physical storage resources 216 of physical storage resource cluster 214 with a logical storage array 220, which may comprise a logical abstraction of those physical storage resources 216. In various embodiments, storage abstraction framework 218 may be configured to create and manage various logical storage volumes (LSVs) within logical storage array 220. In some embodiments, the storage resources 106 that are allocated to storage container 108 may comprise one or more such LSVs. In the example of FIG. 2, storage resources 106 comprise two of the LSVs contained in logical storage array 220. The embodiments are not limited to this example.

Figure 3:
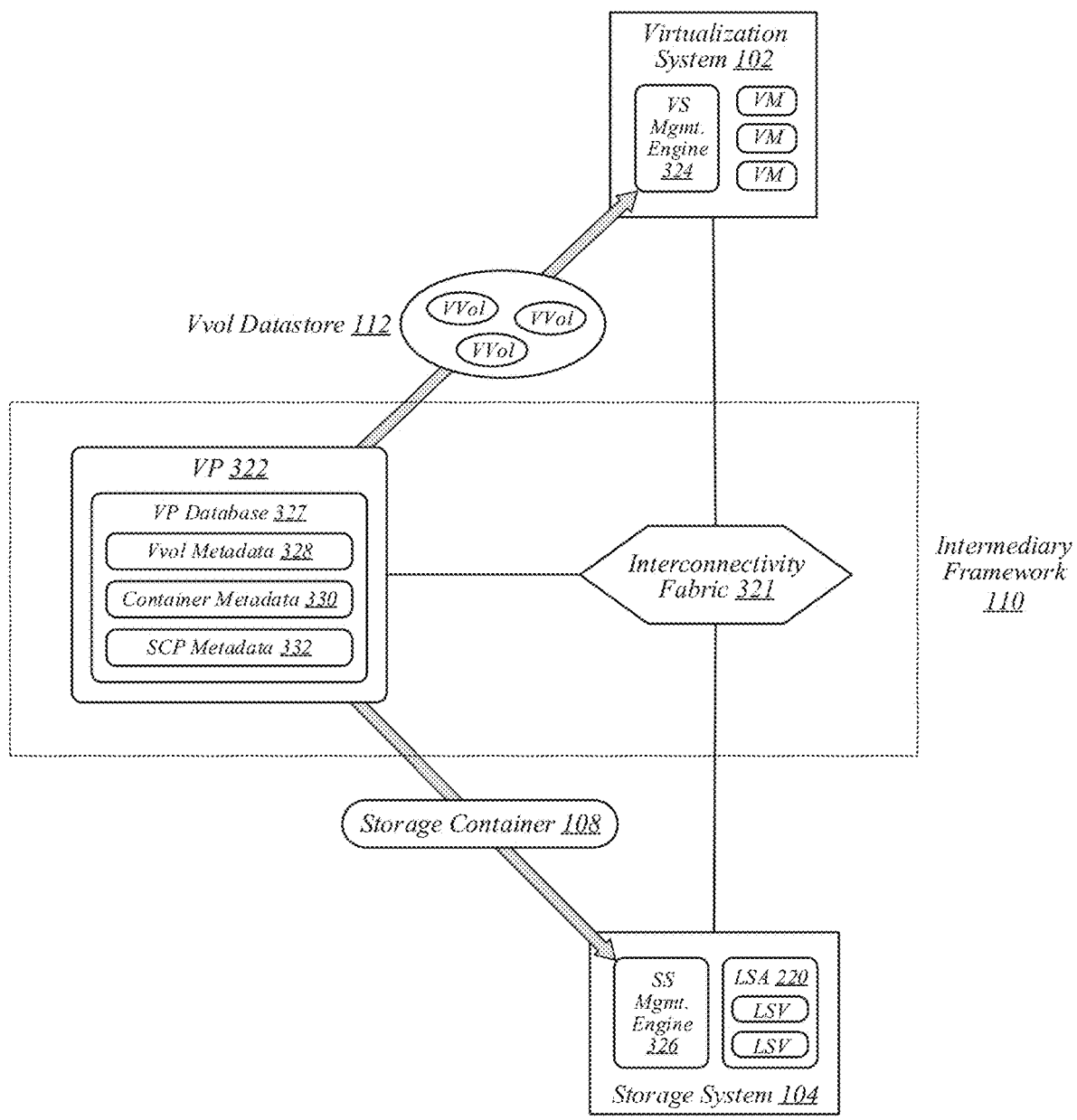
FIG. 3 illustrates an embodiment of a third operating environment.

FIG. 3 illustrates an example of an operating environment 300 that may be representative of various embodiments. In operating environment 300, intermediary framework 110 comprises an interconnectivity fabric 321 and a vendor provider (VP) 322. Interconnectivity fabric 321 may generally comprise a combination of physical infrastructure, interfaces, and protocols enabling the exchange of data signals between virtualization system 102 and storage system 104, as well as the exchange of control signals between VP 322 and both virtualization system 102 and storage system 104. VP 322 may generally serve as an intermediary between virtualization system 102 and storage system 104. In some embodiments, VP 322 may be implemented using as, or on, a virtual machine, such as an appliance virtual machine. In various embodiments, VP 322 may comprise a vSphere APIs for Storage Awareness (VASA) provider. The embodiments are not limited in this context.

In some embodiments, VP 322 may act as an intermediary between a virtualization system (VS) management engine 324 of virtualization system 102 and a storage system (SS) management engine 326 of storage system 104. In various embodiments, VS management engine 324 may generally comprise a centralized management engine that is operative to manage the various virtual machines running within virtualization system 102. In some embodiments, VS management engine 324 may be implemented as a VMware vCenter server. In various embodiments, SS management engine 326 may generally comprise a management engine that is operative to oversee a storage abstraction framework—such as storage abstraction framework 218—in order to apply one or more layers of abstraction with respect to the underlying physical storage resources of storage system 104. In some embodiments, SS management engine 326 may be implemented using NetApp® clustered Data ONTAP® software. The embodiments are not limited in this context.

In various embodiments, by acting as an intermediary between VS management engine 324 and SS management engine 326, VP 322 may enable/facilitate the presentation of storage container 108 to VS management engine 324 in the form of vvol datastore 112. In some embodiments, VP 322 may be operative to establish an association between storage container 108 and logical storage array 220 in storage system 104. In various embodiments, VP 322 may be operative to define storage container 108 to comprise one or more LSVs within logical storage array 220. The embodiments are not limited in this context.

In some embodiments, during ongoing operation, VP 322 may retain various types of metadata. In various embodiments, VP 322 may retain such metadata in a VP database 327. In some embodiments, the metadata that VP 322 retains may include vvol metadata 328. In various embodiments, vvol metadata 328 may include information describing various relevant parameters associated with the vvols comprised in vvol datastore 112. In some embodiments, vvol metadata 328 may include information identifying VMs to which such vvols have been made available for use. In various embodiments, vvol metadata 328 may include information specifying parameters associated with such VMs, such as VM names and/or VM creation timestamps. In some embodiments, vvol metadata 328 may include information indicating the association of vvol datastore 112 with storage container 108. In various embodiments, vvol metadata 428 may additionally include information describing physical mappings of vvols of vvol datastore 412 to storage resources within storage system 404. The embodiments are not limited in this context.

In various embodiments, the metadata that VP 322 retains may include container metadata 330. In some embodiments, container metadata 330 may include information describing storage containers created by VP 322, such as storage container 108. In various embodiments, container metadata 330 may include information indicating that storage container 108 is comprised of LSVs of logical storage array 220 and information identifying a mapping of storage container 108 to particular LSVs of logical storage array 220. In some embodiments, the metadata that VP 322 retains may include storage capability profile (SCP) metadata 332. In various embodiments, SCP metadata 332 may include information describing one or more storage capability profiles, each of which may define a respective set of one or more storage capability requirements. In some embodiments, SCP metadata 332 may include information describing a respective corresponding storage capability profile for each of one or more service levels. For example, in various embodiments, SCP metadata 332 may include information describing a storage capability profile for a gold service level, a storage capability profile for a silver service level, and a storage capability profile for a bronze service level. The embodiments are not limited to this example.

In some embodiments, if VP 322 becomes unusable and/or the metadata of VP database 327 becomes inaccessible, the virtual machines running in virtualization system 102 may not be able to operate properly. In various embodiments, for example, without benefit of the vvol metadata 328 and container metadata 330 maintained by VP 322, virtualization system 102 may have no way of knowing where to look in storage system 104 for the data that has been written to any particular vvol. In order to maintain service continuity, it may thus be desirable that VP 322 be replaced in the event that it becomes unusable and/or the metadata of VP database 327 becomes inaccessible.

Disclosed herein are recovery support techniques that may be implemented in some embodiments in order to enable successful recovery following the loss of a VP and/or the loss of metadata in its VP database. According to various such techniques, VP metadata may generally be backed up to storage locations within a storage system such as storage system 104. In some embodiments, the VP metadata may include vvol metadata such as vvol metadata 328. In various embodiments, the VP metadata may include container metadata such as container metadata 330. In some embodiments, the VP metadata may include SCP metadata such as SCP metadata 332. In various embodiments, the VP metadata may be compressed prior to being written to storage in the storage system. In some embodiments, VP metadata that is backed up within the storage system may subsequently be used to recover from a loss of the VP. The embodiments are not limited in this context.

Figure 4:
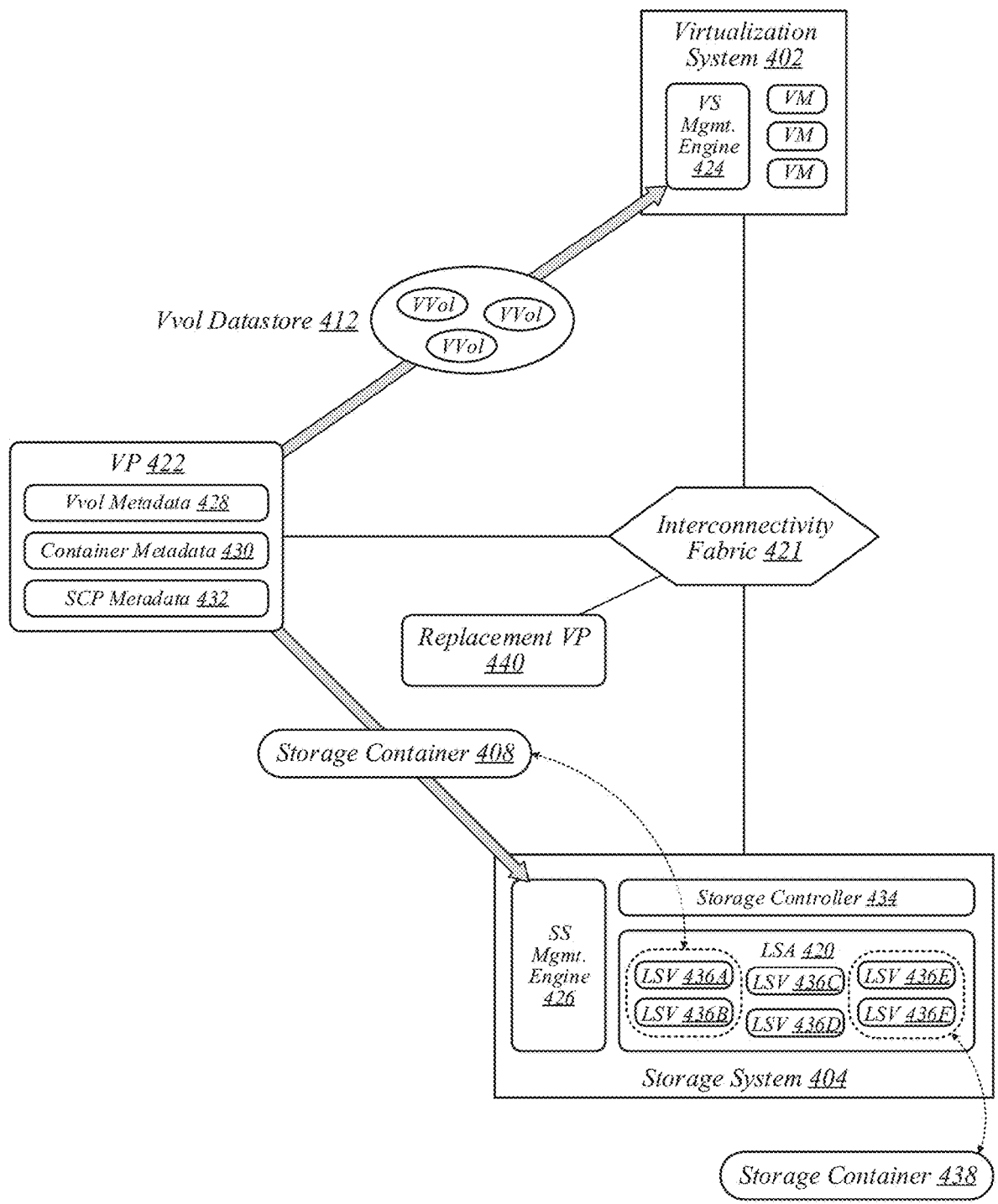
FIG. 4 illustrates an embodiment of a fourth operating environment.

FIG. 4 illustrates an example of an operating environment 400 that may be representative of various embodiments. More particularly, operating environment 400 may be representative of some embodiments in which a VP 422 is configured to implement one or more of the disclosed recovery support techniques. In operating environment 400, VP 422 generally serves as an intermediary between a virtualization system 402 and a storage system 404. In various embodiments, virtualization system 402 and storage system 404 may be the same as—or similar to—virtualization system 102 and storage system 104, respectively, of FIGS. 1 to 3. In some embodiments, the exchange of data and control signals amongst virtualization system 402, storage system 404, and VP 422 may be enabled by an interconnectivity fabric 421, which may be the same as—or similar to—interconnectivity fabric 321 of FIG. 3. In various embodiments, the various virtual machines running within virtualization system 402 may be managed by a VS management engine 424, which may be the same as—or similar to—VS management engine 324 of FIG. 3. In some embodiments, a storage abstraction framework of storage system 404 may be overseen by a SS management engine 426, which may be the same as—or similar to—SS management engine 326 of FIG. 3. The embodiments are not limited in this context.

In various embodiments, VP 422 may be operative to define a storage container 408, which it may associate with a logical storage array 420 of storage system 404. In some embodiments, logical storage array 420 may be the same as—or similar to—logical storage array 220 of FIGS. 2 and 3. In various embodiments, VP 422 may be operative to define storage container 408 to comprise one or more LSVs within logical storage array 420. In some embodiments, VP 422 may be operative to associate storage container 408 with a vvol datastore 412, which it may present to virtualization system 402. In various embodiments, virtualization system 402 may create one or more vvols within vvol datastore 412. In some embodiments, VS management engine 424 may allocate such vvols to VMs running within virtualization system 402. In various embodiments, VS management engine 424 may be operative to notify VP 422 of the identities of the VMs to which such vvols have been allocated. In some embodiments, VS management engine 424 may be operative to provide VP 422 with VM names and/or VM creation timestamps associated with such VMs. The embodiments are not limited in this context.

In various embodiments, during ongoing operation, VP 422 may be operative to generate and/or retain vvol metadata 428 for the various vvols comprised in vvol datastore 412. In some embodiments, vvol metadata 428 may be the same as—or similar to—vvol metadata 328 of FIG. 3. In various embodiments, VP 422 may be operative to back up any given portion of vvol metadata 428 by storing that portion of vvol metadata 428 within storage system 404 in addition to retaining it locally. In some such embodiments, in conjunction with backing up a given portion of vvol metadata 428, VP 422 write that portion of vvol metadata 428 to a storage controller 434 within storage system 404. In various embodiments, VP 422 may be operative to compress a given portion of vvol metadata 428 that is to be backed up in storage system 404, and may store the compressed portion of vvol metadata 428 in storage system 404. The embodiments are not limited in this context.

In various embodiments, storage system 404 may comprise a SAN storage system, and VP 422 may be operative to write a given portion of vvol metadata 428 to one or more logical unit number (LUN) attributes. In some embodiments, VP 422 may be operative to write a given portion of vvol metadata 428 to multiple LUN attributes if that portion of vvol metadata 428 is larger than a certain size, and may otherwise write that portion of vvol metadata 428 to a single LUN attribute. For example, in various embodiments, VP 422 may be operative to write a given portion of vvol metadata 428 to a single LUN attribute if that portion of vvol metadata 428 comprises a size of 4092 bytes or less, and may otherwise split that portion of vvol metadata 428 across multiple LUN attributes. The embodiments are not limited to this example.

In some embodiments, storage system 404 may comprise an NAS storage system. In various such embodiments, the manner in which VP 422 backs up a given portion of vvol metadata 428 within storage system 404 may depend on a vvol type of a vvol with which that portion of vvol metadata 428 is associated. In some embodiments, if a given portion of vvol metadata 428 is associated with a Config vvol, VP 422 may be operative to write that portion of vvol metadata 428 as a file in a directory within a file system of the NAS storage system. In various embodiments, if a given portion of vvol metadata 428 is associated with another type of vvol, such as a vvol of type Data, Swap, or Other, VP 422 may be operative to write that portion of vvol metadata 428 to a file stream of the NAS storage system. The embodiments are not limited in this context.

In some embodiments, VP 422 may be operative to generate and/or retain container metadata 430 associated with storage containers that it creates, such as storage container 408. In various embodiments, container metadata 430 may be the same as—or similar to—container metadata 330 of FIG. 3. In some embodiments, VP 422 may be operative to generate and/or retain SCP metadata 432 associated with one or more storage capability profiles. In various embodiments, SCP metadata 432 may be the same as—or similar to—SCP metadata 332 of FIG. 3. The embodiments are not limited in this context.

In some embodiments, VP 422 may be operative to back up container metadata 430 and SCP metadata 432 by storing container metadata 430 and SCP metadata 432 in one or more files within storage system 404, in addition to retaining container metadata 430 and SCP metadata 432 locally. Such files shall hereinafter be referred to as "metadata backup files." In various embodiments, each metadata backup file may comprise an Extensible Markup Language (XML) file. In some embodiments, with respect to a given storage container, VP 422 may be operative to create a respective metadata backup file within each LSV associated with that storage container. For example, if storage container 408 is associated with LSVs 436A and 436B comprised in logical storage array 420, VP 422 may be operative to create respective metadata backup files within both LSV 436A and 436B. In various embodiments, with respect to a given logical storage array, VP 422 may be operative to create a respective metadata backup file within each LSV of each storage container associated with that logical storage array. For example, if storage container 408 is associated with LSVs 436A and 436B comprised in logical storage array 420 and a storage container 438 is associated with LSVs 436E and 436F comprised in logical storage array 420, VP 422 may be operative to create respective metadata backup files within each of LSVs 436A, 436B, 436E, and 436F. In some embodiments, VP 422 may refrain from creating metadata backup files within LSVs that are not associated with storage containers. For example, if logical storage array 420 comprises LSVs 436C and 436D, and neither is associated with any storage container, then VP 422 may refrain from creating metadata backup files within LSVs 436C and 436D. The embodiments are not limited to these examples.

In various embodiments, a common set of container and SCP metadata may be stored within each metadata backup file that VP 422 creates within a given logical storage array.

In some embodiments, each metadata backup file that VP 422 creates within a given logical storage array may comprise container metadata 430 and SCP metadata 432 for all storage containers associated with that logical storage array. For example, in the aforementioned scenario in which VP 422 may be operative to create respective metadata backup files within each of LSVs 436A, 436B, 436E, and 436F of logical storage array 420, each such metadata backup file may contain all of the container metadata 430 and SCP metadata 432 for both storage container 408 and storage container 438. In various embodiments, each metadata backup file that VP 422 creates within a given logical storage array may comprise the contents of a vvol.properties file that VP 422 maintains during ongoing operation. In some embodiments, the redundant storage of all of the container metadata 430 and SCP metadata 432 for an entire logical storage array within each LSV of each storage container associated with that logical storage array may provide a safeguard against the loss of metadata in the event that a given LSV or metadata backup file becomes unusable. In various embodiments, if a given LSV—or the metadata backup file that it contains—becomes unusable, the information contained in that metadata backup file may be retrieved from a metadata backup file within another LSV. The embodiments are not limited in this context.

In some embodiments, VP 422 may be operative to update the metadata that it backs up in storage system 404 on a continual basis as that metadata changes during the course of ongoing operation. In various embodiments, VP 422 may be operative to update such metadata using a multi-threaded approach, in order to minimize any impact upon system performance with respect to vvol operations. The embodiments are not limited in this context.

In some embodiments, in the event that VP 422 becomes unusable, a replacement VP 440 may be deployed to replace it. In various embodiments in which VP 422 is implemented as a virtual machine, replacement VP 440 may be deployed as another virtual machine. In some embodiments, a VP recovery procedure may be initiated in order to reconstruct vvol metadata 428, container metadata 430, and SCP metadata 432 and provide it to replacement VP 440. In various embodiments, the VP recovery procedure may be initiated by running a single VP command line interface (CLI) command. In some embodiments, the VP recovery procedure may involve retrieving backed-up vvol metadata 428, container metadata 430, and SCP metadata 432 from storage system 404. In various embodiments, a VP database may be constructed for replacement VP 440 using the vvol metadata 428, container metadata 430, and SCP metadata 432 retrieved from storage system 404. In some embodiments, the VP recovery procedure may implement a multi-threaded approach, in order to support scalability. In various embodiments, replacement VP 440 may be operative to perform post-processing on the retrieved metadata, in order to cause virtualization system 402 to regard replacement VP 440 as being the same entity as VP 422. The embodiments are not limited in this context.

In some embodiments, container metadata 430 and SCP metadata 432 may be retrieved during a first phase of the VP recovery procedure. In various embodiments, the first phase of the VP recovery procedure may involve—with respect to a given logical storage array—retrieving a respective metadata backup file from each LSV of that logical storage array that contains such a file. For example, in operating environment 400, the first phase of the VP recovery procedure may involve retrieving respective metadata backup files from each of LSVs 436A, 436B, 436E, and 436F. In some embodiments, once the metadata backup files of a given logical storage array have been retrieved, an arbitration procedure may be used to select a metadata backup file for use in reconstructing container metadata 430 and SCP metadata 432. In various embodiments, according to the arbitration procedure, a most recently updated file may be identified and used to reconstruct container metadata 430 and SCP metadata 432. In various embodiments, the most recently updated metadata backup file may be identified as a metadata backup file featuring a latest "last modified" timestamp. It is to be appreciated that in some embodiments, other criteria may be used to select the metadata backup file for use in reconstructing container metadata 430 and SCP metadata 432 according to the arbitration procedure. For example, in various embodiments, the arbitration procedure may involve reconciling the retrieved metadata backup files against other independent sources of relevant metadata. The embodiments are not limited to this example.

In some embodiments, multiple logical storage arrays of a same storage system may contain LSVs associated with storage containers created by a same lost VP. In various such embodiments, the VP recovery procedure may involve—for each of multiple logical storage arrays—reconstructing respective container metadata 430 and SCP metadata 432 using a most recently updated metadata backup file among the metadata backup files of that logical storage array. In some embodiments, the respective reconstructions of the container metadata 430 and SCP metadata 432 of the multiple logical storage arrays may be conducted in parallel in order to speed up the VP recovery process. The embodiments are not limited in this context.

In various embodiments, vvol metadata 428 may be retrieved during a second phase of the VP recovery procedure. In some embodiments, with respect to a given storage container, the second phase of the VP recovery procedure may involve retrieving respective vvol metadata 428 for each LSV associated with that storage container. In various embodiments, storage system 404 may comprise a SAN storage system, and the vvol metadata 428 for a given storage container may be retrieved by identifying LUNs associated with the LSVs of that storage container and reading LUN attributes associated with those LUNs. In some embodiments, storage system 404 may comprise an NAS storage system, and the vvol metadata 428 for a given storage container may be retrieved by reading file system directories and file streams associated with LSVs of that storage container. In various embodiments, respective reconstructions of the vvol metadata 428 of multiple logical storage arrays may be conducted in parallel in order to speed up the VP recovery process. In some embodiments, during a third phase of the VP recovery procedure, the contents of a vvol.properties file previously maintained by VP 422 may be retrieved from storage system 404, and that vvol.properties file may be recreated for use by replacement VP 440. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
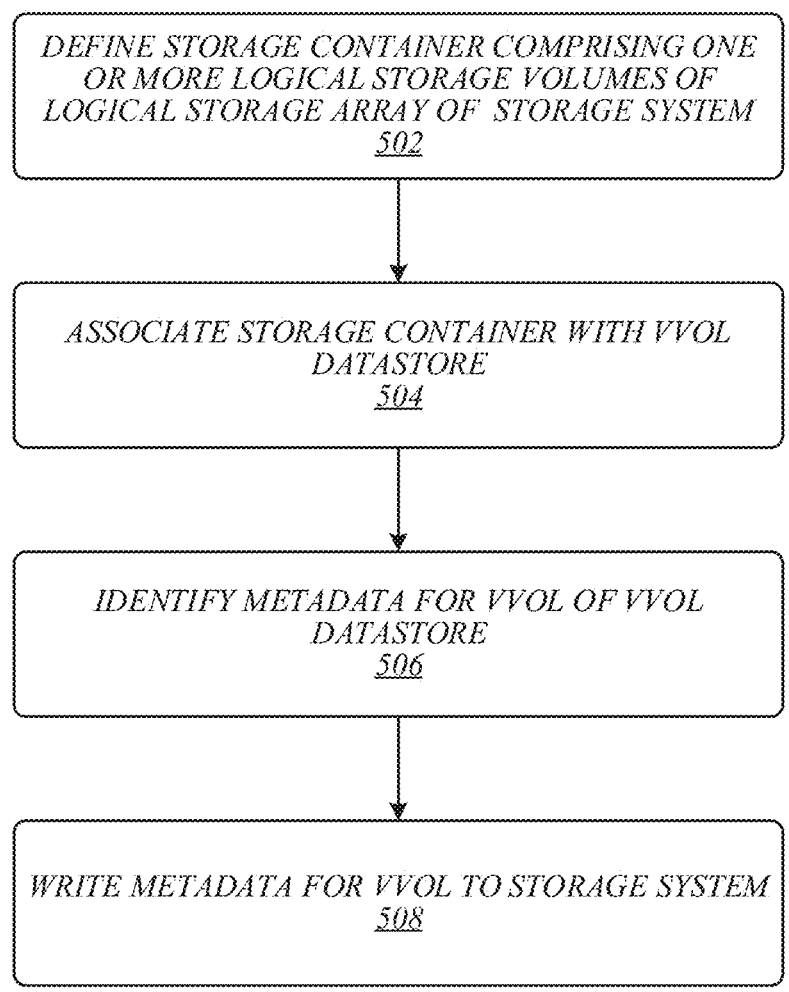
FIG. 5 illustrates an embodiment of a logic flow.

FIG. 5 illustrates an example of a logic flow 500 that may be representative of the implementation of one or more of the disclosed recovery support techniques for storage virtualization environments according to various embodiments. For example, logic flow 500 may be representative of operations that may be performed in some embodiments by VP 422 in operating environment 400 of FIG. 4. As shown in FIG. 5, a storage container may be defined at 502 that comprises one or more logical storage volumes of a logical storage array of a storage system. For example, in operating environment 400 of FIG. 4, VP 422 may be operative to define storage container 408, which may comprise LSVs 436A and 436B of logical storage array 420 of storage system 404. At 504, the storage container may be associated with a vvol storage array. For example, in operating environment 400 of FIG. 4, VP 422 may be operative to associate storage container 408 with vvol datastore 412. At 506, metadata for a vvol of the vvol datastore may be identified. For example, in operating environment 400 of FIG. 4, VP 422 may be operative to identify metadata for a vvol of vvol datastore 412. At 508, the metadata for the vvol may be written to the storage system. For example, in operating environment 400 of FIG. 4, VP 422 may be operative to write identified metadata for a vvol to storage system 404. The embodiments are not limited to these examples.

Figure 6:
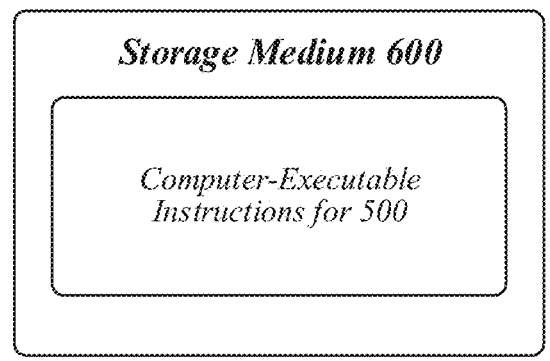
FIG. 6 illustrates an embodiment of a storage medium.

FIG. 6 illustrates an embodiment of a storage medium 600. Storage medium 600 may comprise any non-transitory computer-readable storage medium or machine-readable storage medium, such as an optical, magnetic or semiconductor storage medium. In various embodiments, storage medium 600 may comprise an article of manufacture. In some embodiments, storage medium 600 may store computer-executable instructions, such as computer-executable instructions to implement logic flow 500 of FIG. 5. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 7:
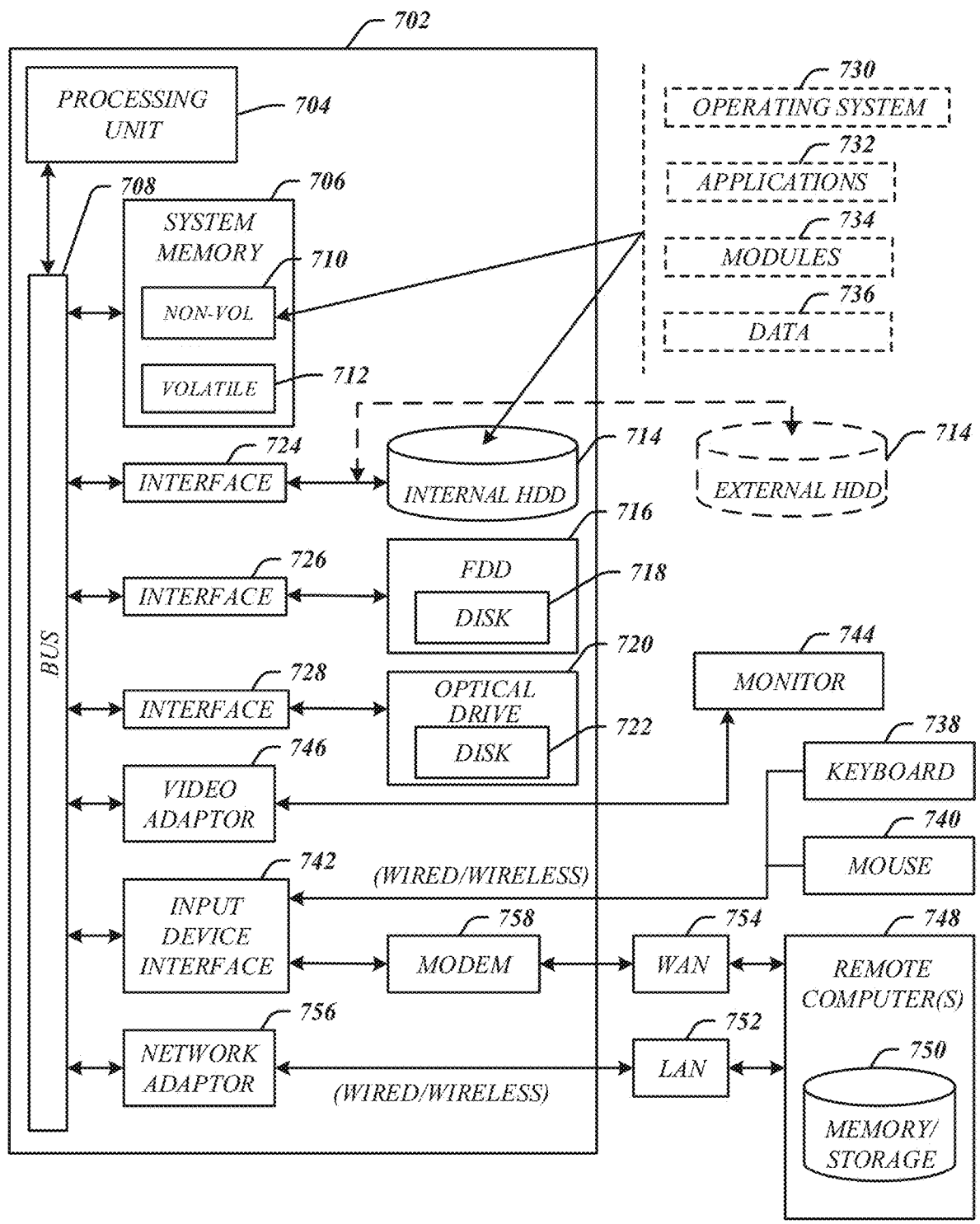
FIG. 7 illustrates an embodiment of a computing architecture.

FIG. 7 illustrates an embodiment of an exemplary computing architecture 700 that may be suitable for implementing various embodiments as previously described. In various embodiments, the computing architecture 700 may comprise or be implemented as part of an electronic device. In some embodiments, the computing architecture 700 may be representative, for example, of a server that implements one or more of VP 422 of FIG. 4, logic flow 500 of FIG. 5, and storage medium 600 of FIG. 6. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of VP 422 of FIG. 4.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
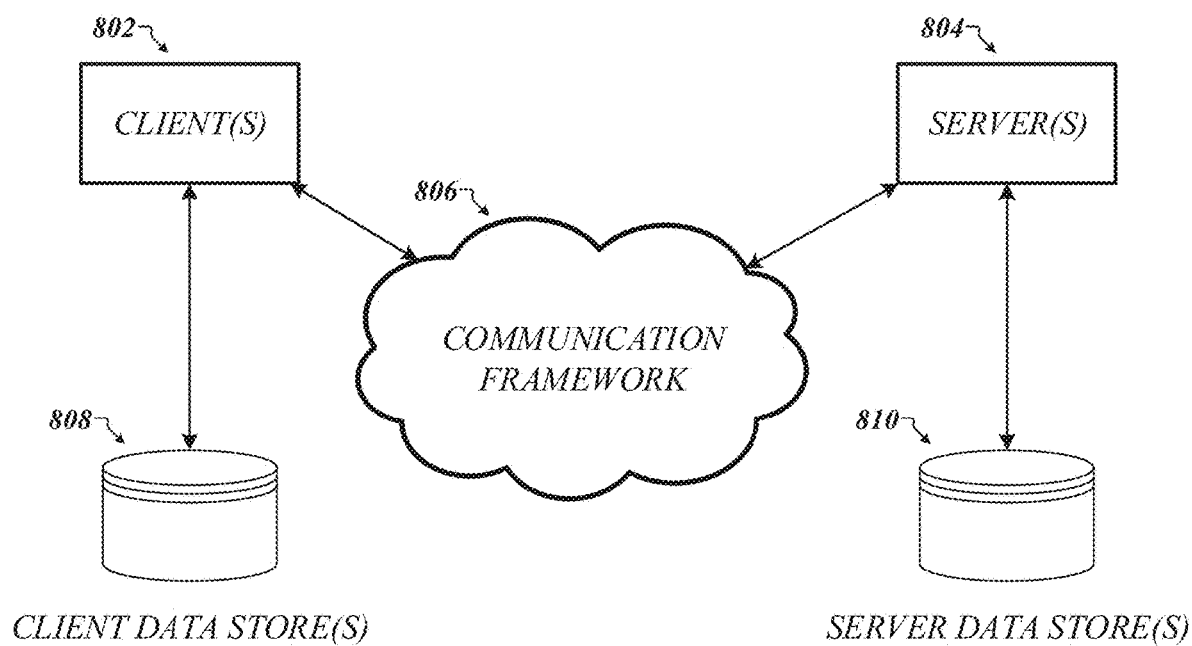
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. The clients 802 and the servers 804 are operatively connected to one or more respective client data stores 808 and server data stores 810 that can be employed to store information local to the respective clients 802 and servers 804, such as cookies and/or associated contextual information. In various embodiments, any one of servers 804 may implement one or both of logic flow 500 of FIG. 5 and storage medium 600 of FIG. 6 in conjunction with storage of data received from any one of clients 802 on any of server data stores 810.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a method, comprising defining, by processing circuitry, a storage container comprising one or more logical storage volumes of a logical storage array of a storage system, associating the storage container with a virtual volume (vvol) datastore, identifying metadata for a vvol of the vvol datastore, and writing the metadata for the vvol to the storage system.

Example 2 is the method of Example 1, the storage system to comprise a storage area network (SAN) storage system.

Example 3 is the method of Example 2, comprising writing the metadata for the vvol to logical unit number (LUN) attributes of one or more LUNs associated with the storage container.

Example 4 is the method of Example 1, the storage system to comprise a network-attached storage (NAS) storage system.

Example 5 is the method of Example 4, comprising writing the metadata for the vvol to a file stream associated with the storage container.

Example 6 is the method of Example 4, comprising writing the metadata for the vvol to a file in a directory of a file system associated with the storage container.

Example 7 is the method of any of Examples 1 to 6, comprising writing the metadata for the vvol to a storage controller of the storage system.

Example 8 is the method of any of Examples 1 to 7, comprising identifying metadata for the storage container, and writing the metadata for the storage container to respective metadata backup files in each of the one or more logical storage volumes.

Example 9 is the method of any of Examples 1 to 8, comprising identifying metadata for one or more storage capability profiles, and writing the metadata for the one or more storage capability profiles to respective metadata backup files in each of the one or more logical storage volumes.

Example 10 is the method of any of Examples 8 to 9, each of the metadata backup files to comprise an Extensible Markup Language (XML) file.

Example 11 is the method of any of Examples 8 to 10, comprising writing the contents of a vvol.properties file to each of the metadata backup files.

Example 12 is the method of any of Examples 1 to 11, the metadata for the vvol to identify a virtual machine (VM) to which the vvol is accessible.

Example 13 is the method of Example 12, the metadata for the vvol to identify a VM name associated with the VM.

Example 14 is the method of any of Examples 12 to 13, the metadata for the vvol to identify a VM creation timestamp associated with the VM.

Example 15 is at least one non-transitory computer-readable storage medium comprising a set of instructions that, in response to being executed on a computing device, cause the computing device to perform a method according to any of Examples 1 to 14.

Example 16 is an apparatus, comprising means for performing a method according to any of Examples 1 to 14.

Example 17 is a non-transitory machine-readable medium having stored thereon instructions for performing a metadata management method, comprising machine-executable code which when executed by at least one machine, causes the machine to define a storage container comprising one or more logical storage volumes of a logical storage array of a storage system, associate the storage container with a virtual volume (vvol) datastore, identify metadata for a vvol of the vvol datastore, and write the metadata for the vvol to the storage system.

Example 18 is the non-transitory machine-readable medium of Example 17, the storage system to comprise a storage area network (SAN) storage system.

Example 19 is the non-transitory machine-readable medium of Example 18, comprising machine-executable code which when executed by the at least one machine, causes the machine to write the metadata for the vvol to logical unit number (LUN) attributes of one or more LUNs associated with the storage container.

Example 20 is the non-transitory machine-readable medium of Example 17, the storage system to comprise a network-attached storage (NAS) storage system.

Example 21 is the non-transitory machine-readable medium of Example 20, comprising machine-executable code which when executed by the at least one machine, causes the machine to write the metadata for the vvol to a file stream associated with the storage container.

Example 22 is the non-transitory machine-readable medium of Example 20, comprising machine-executable code which when executed by the at least one machine, causes the machine to write the metadata for the vvol to a file in a directory of a file system associated with the storage container.

Example 23 is the non-transitory machine-readable medium of any of Examples 17 to 22, comprising machine-executable code which when executed by the at least one machine, causes the machine to write the metadata for the vvol to a storage controller of the storage system.

Example 24 is the non-transitory machine-readable medium of any of Examples 17 to 23, comprising machine-executable code which when executed by the at least one machine, causes the machine to identify metadata for the storage container, and write the metadata for the storage container to respective metadata backup files in each of the one or more logical storage volumes.

Example 25 is the non-transitory machine-readable medium of any of Examples 17 to 24, comprising machine-executable code which when executed by the at least one machine, causes the machine to identify metadata for one or more storage capability profiles, and write the metadata for the one or more storage capability profiles to respective metadata backup files in each of the one or more logical storage volumes.

Example 26 is the non-transitory machine-readable medium of any of Examples 24 to 25, each of the metadata backup files to comprise an Extensible Markup Language (XML) file.

Example 27 is the non-transitory machine-readable medium of any of Examples 24 to 26, comprising machine-executable code which when executed by the at least one machine, causes the machine to write the contents of a vvol.properties file to each of the metadata backup files.

Example 28 is the non-transitory machine-readable medium of any of Examples 17 to 27, the metadata for the vvol to identify a virtual machine (VM) to which the vvol is accessible.

Example 29 is the non-transitory machine-readable medium of Example 28, the metadata for the vvol to identify a VM name associated with the VM.

Example 30 is the non-transitory machine-readable medium of any of Examples 28 to 29, the metadata for the vvol to identify a VM creation timestamp associated with the VM.

Example 31 is a computing device, comprising a memory containing a machine-readable medium comprising machine-executable code, having stored thereon instructions for performing a metadata management method, and a processor coupled to the memory, the processor configured to execute the machine-executable code to cause the processor to define a storage container comprising one or more logical storage volumes of a logical storage array of a storage system, associate the storage container with a virtual volume (vvol) datastore, identify metadata for a vvol of the vvol datastore, and write the metadata for the vvol to the storage system.

Example 32 is the computing device of Example 31, the storage system to comprise a storage area network (SAN) storage system.

Example 33 is the computing device of Example 32, the processor configured to execute the machine-executable code to cause the processor to write the metadata for the vvol to logical unit number (LUN) attributes of one or more LUNs associated with the storage container.

Example 34 is the computing device of Example 31, the storage system to comprise a network-attached storage (NAS) storage system.

Example 35 is the computing device of Example 34, the processor configured to execute the machine-executable code to cause the processor to write the metadata for the vvol to a file stream associated with the storage container.

Example 36 is the computing device of Example 34, the processor configured to execute the machine-executable code to cause the processor to write the metadata for the vvol to a file in a directory of a file system associated with the storage container.

Example 37 is the computing device of any of Examples 31 to 36, the processor configured to execute the machine-executable code to cause the processor to write the metadata for the vvol to a storage controller of the storage system.

Example 38 is the computing device of any of Examples 31 to 37, the processor configured to execute the machine-executable code to cause the processor to identify metadata for the storage container, and write the metadata for the storage container to respective metadata backup files in each of the one or more logical storage volumes.

Example 39 is the computing device of any of Examples 31 to 38, the processor configured to execute the machine-executable code to cause the processor to identify metadata for one or more storage capability profiles, and write the metadata for the one or more storage capability profiles to respective metadata backup files in each of the one or more logical storage volumes.

Example 40 is the computing device of any of Examples 38 to 39, each of the metadata backup files to comprise an Extensible Markup Language (XML) file.

Example 41 is the computing device of any of Examples 38 to 40, the processor configured to execute the machine-executable code to cause the processor to write the contents of a vvol.properties file to each of the metadata backup files.

Example 42 is the computing device of any of Examples 31 to 41, the metadata for the vvol to identify a virtual machine (VM) to which the vvol is accessible.

Example 43 is the computing device of Example 42, the metadata for the vvol to identify a VM name associated with the VM.

Example 44 is the computing device of any of Examples 42 to 43, the metadata for the vvol to identify a VM creation timestamp associated with the VM.

Example 45 is an apparatus, comprising means for defining a storage container comprising one or more logical storage volumes of a logical storage array of a storage system, means for associating the storage container with a virtual volume (vvol) datastore, means for identifying metadata for a vvol of the vvol datastore, and means for writing the metadata for the vvol to the storage system.

Example 46 is the apparatus of Example 45, the storage system to comprise a storage area network (SAN) storage system.

Example 47 is the apparatus of Example 46, comprising means for writing the metadata for the vvol to logical unit number (LUN) attributes of one or more LUNs associated with the storage container.

Example 48 is the apparatus of Example 45, the storage system to comprise a network-attached storage (NAS) storage system.

Example 49 is the apparatus of Example 48, comprising means for writing the metadata for the vvol to a file stream associated with the storage container.

Example 50 is the apparatus of Example 48, comprising means for writing the metadata for the vvol to a file in a directory of a file system associated with the storage container.

Example 51 is the apparatus of any of Examples 45 to 50, comprising means for writing the metadata for the vvol to a storage controller of the storage system.

Example 52 is the apparatus of any of Examples 45 to 51, comprising means for identifying metadata for the storage container, and means for writing the metadata for the storage container to respective metadata backup files in each of the one or more logical storage volumes.

Example 53 is the apparatus of any of Examples 45 to 52, comprising means for identifying metadata for one or more storage capability profiles, and means for writing the metadata for the one or more storage capability profiles to respective metadata backup files in each of the one or more logical storage volumes.

Example 54 is the apparatus of any of Examples 52 to 53, each of the metadata backup files to comprise an Extensible Markup Language (XML) file.

Example 55 is the apparatus of any of Examples 52 to 54, comprising means for writing the contents of a vvol.properties file to each of the metadata backup files.

Example 56 is the apparatus of any of Examples 45 to 55, the metadata for the vvol to identify a virtual machine (VM) to which the vvol is accessible.

Example 57 is the apparatus of Example 56, the metadata for the vvol to identify a VM name associated with the VM.

Example 58 is the apparatus of any of Examples 56 to 57, the metadata for the vvol to identify a VM creation timestamp associated with the VM.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, novel subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   generating virtual volume metadata comprising parameters associated with a virtual volume within a virtual volume data store, wherein a portion of the virtual volume metadata is written to a file within a directory in a file system when the virtual volume is a configuration virtual volume or the portion of the virtual volume metadata is written as a file stream when the virtual volume is a swap virtual volume;
   utilizing the virtual volume metadata to expose the virtual volume to a virtual machine; and
   managing interactions between the virtual volume and the virtual machine using the virtual volume metadata.

2. The method of claim 1, wherein the generating comprises:
   generating the virtual volume metadata to comprise information identifying virtual machines to which virtual volumes have been made available.

3. The method of claim 1, wherein the parameters comprise a virtual machine name and a virtual machine creation timestamp.

4. The method of claim 1, wherein the generating comprises:
   generating the virtual volume metadata to comprise information describing a mapping of the virtual volume to storage resources within a storage system.

5. The method of claim 1, comprising:
   generating storage capability profile metadata describing one or more storage capabilities profiles, wherein a storage capability profile defines a set of storage capability requirements.

6. The method of claim 1, comprising:
   writing a portion of the virtual volume metadata into a logical unit number attribute.

7. The method of claim 1, comprising:
   writing a portion of the virtual volume metadata into a first logical unit number attribute and a second logical unit number attribute based upon the portion of the virtual volume metadata being larger than a threshold size.

8. The method of claim 1, comprising:
   in response to a determination that a portion of the virtual volume metadata is associated with a data virtual volume, writing the portion as a file stream.

9. A non-transitory machine readable medium comprising instructions for performing a method, which when executed by a machine, causes the machine to:
   generate virtual volume metadata comprising parameters associated with a virtual volume within a virtual volume data store, wherein a portion of the virtual volume metadata is written to a file within a directory in a file system when the virtual volume is a configuration virtual volume or the portion of the virtual volume metadata is written as a file stream when the virtual volume is a swap virtual volume;
   utilize the virtual volume metadata to expose the virtual volume to a virtual machine; and
   manage interactions between the virtual volume and the virtual machine using the virtual volume metadata.

10. The non-transitory machine readable medium of claim 9, wherein the instructions cause the machine to:
    create a metadata backup file, comprising container metadata and storage capacity profile metadata for storage containers associated with a first logical storage array, within the first logical storage array.

11. The non-transitory machine readable medium of claim 10, wherein the instructions cause the machine to:
    redundantly store the metadata backup file within multiple storage locations associated with the first logical storage array.

12. The non-transitory machine readable medium of claim 10, wherein the instructions cause the machine to:
    store the metadata backup file within a first logical storage volume and a second logical storage volume associated with the first logical storage array.

13. The non-transitory machine readable medium of claim 9, wherein the instructions cause the machine to:
    update the virtual volume metadata based upon a metadata change occurring during operation of the virtual machine.

14. The non-transitory machine readable medium of claim 13, wherein the virtual volume metadata is updated utilizing a multi-thread approach.

15. A computing device comprising:
    a memory comprising machine executable code for performing a method; and a processor coupled to the memory, the processor configured to execute the machine executable code to cause the processor to:
    generate virtual volume metadata comprising parameters associated with a virtual volume within a virtual volume data store, wherein a portion of the virtual volume metadata is written to a file within a directory in a file system when the virtual volume is a configuration virtual volume or the portion of the virtual volume metadata is written as a file stream when the virtual volume is a swap virtual volume;
    utilize the virtual volume metadata to expose the virtual volume to a virtual machine; and
    manage interactions between the virtual volume and the virtual machine using the virtual volume metadata.

16. The computing device of claim 15, wherein the machine executable code causes the processor to:
    generate the virtual volume metadata to comprise information identifying virtual machines to which virtual volumes have been made available.

17. The computing device of claim 15, wherein the parameters comprise a virtual machine name and a virtual machine creation timestamp.

18. The computing device of claim 15, wherein the machine executable code causes the processor to:
generate the virtual volume metadata to comprise information describing a mapping of the virtual volume to storage resources within a storage system.

* * * * *